(12) United States Patent
Barrios et al.

(10) Patent No.: US 10,989,659 B2
(45) Date of Patent: Apr. 27, 2021

(54) CHEMICAL PROBES FOR HYDROGEN SULFIDE

(71) Applicant: The University of Utah Research Foundation, Salt Lake City, UT (US)

(72) Inventors: Amy M. Barrios, Salt Lake City, UT (US); Megan Youmans, Salt Lake City, UT (US); Kellie L. Tuck, Clayton (AU); Bim Graham, Parkville (AU)

(73) Assignee: University of Utah Research Foundation, Salt Lake City, UT (US)

( * ) Notice: Subject to any disclaimer, the term of this patent is extended or adjusted under 35 U.S.C. 154(b) by 303 days.

(21) Appl. No.: 15/505,478

(22) PCT Filed: Aug. 18, 2015

(86) PCT No.: PCT/US2015/045676
§ 371 (c)(1),
(2) Date: Feb. 21, 2017

(87) PCT Pub. No.: WO2016/028768
PCT Pub. Date: Feb. 25, 2016

(65) Prior Publication Data
US 2017/0268997 A1 Sep. 21, 2017

Related U.S. Application Data

(60) Provisional application No. 62/040,330, filed on Aug. 21, 2014.

(51) Int. Cl.
*G01N 21/64* (2006.01)
*E21B 49/08* (2006.01)
(Continued)

(52) U.S. Cl.
CPC ............ *G01N 21/64* (2013.01); *E21B 49/08* (2013.01); *G01N 21/29* (2013.01);
(Continued)

(58) Field of Classification Search
CPC .... G01N 21/64; G01N 21/6447; G01N 21/29; G01N 21/8483; G01N 21/6428; E21B 49/08; C01B 17/16; C10L 1/24
See application file for complete search history.

(56) References Cited

U.S. PATENT DOCUMENTS

| 2003/0134426 A1* | 7/2003 | Jiang ................ E21B 47/011 436/121 |
| 2007/0087452 A1 | 4/2007 | Parker |
| 2013/0137128 A1 | 5/2013 | MacKay et al. |

FOREIGN PATENT DOCUMENTS

WO    WO 2009055200 A2    4/2009

OTHER PUBLICATIONS

Tropiano et al ("A lanthanide based sensor for the time-gated detection of hydrogen sulfide" Chem. Commun., 2014, 50, pp. 4696-4698 (Year: 2014).*

(Continued)

*Primary Examiner* — Dennis White
(74) *Attorney, Agent, or Firm* — Thorpe North & Western, LLP

(57) ABSTRACT

Chemical probes and methods for detecting and/or quantifying hydrogen sulfide are disclosed. More particularly, this application discloses chemical probes and methods for their use for detecting and/or quantifying hydrogen sulfide in industrial and environmental samples and effluents, including samples of crude oil and sour water produced by petrochemical and other industrial processes.

9 Claims, 9 Drawing Sheets

Probe 1

Probe 2

Probe 3

(51) Int. Cl.
  G01N 21/84    (2006.01)
  G01N 21/29    (2006.01)
  C01B 17/16    (2006.01)
  C10L 1/24     (2006.01)
(52) U.S. Cl.
  CPC ..... *G01N 21/6428* (2013.01); *G01N 21/6447* (2013.01); *G01N 21/8483* (2013.01); *C01B 17/16* (2013.01); *C10L 1/24* (2013.01)

(56) References Cited

OTHER PUBLICATIONS

Mike Williams, "Hydrogen sulfide nanoreporters gather intel on oil before pumping" (Apr. 21, 2014) retrieved May 22, 2019 from https://phys.org/news/2014-04-hydrogen-sulfide-nanoreporters-intel-oil.html (Year: 2014).*

Liu et al, "A visible light excitable colorimetric and fluorescent ESIPT probe for rapid and selective detection of hydrogen sulfide" Org. Biomol. Chem., 2014, 12, 438-445 (Year: 2014).*

Dai, et al., "Ratiometric Time-Gates Luminescence Probe for Hydrogen Sulfide Based on Lanthanide Complexes", Anal. Chem., vol. 86, No. 23, Nov. 12, 2014.

PCT/US15/045676, International Search Report and Written Opinion, dated Jan. 12, 2016, 11 pages.

PCT/US2015/045676, International Preliminary Report on Patentability, dated Feb. 21, 2017, 8 pages.

Pershagen, et al., "Luminescent Lanthanide Complexes with Analyte-Triggered Antenna Formation", J. Am. Chem. Soc., vol. 134, No. 34, 2012, pp. 9832-9835.

Pluth, et al., "Chemical Tools for Studying Biological Hydrogen Sulfide", Biochalcogen Chemistry: The Biological Chemistry of Sulfur, Selenium, and Tellurium, 2013, 18 pages.

Caron et al., "Gas Chromatographic Determination of Volatile Sulfides at Trace Levels in Natural Freshwaters"; Analytical Chemistry; (Jan. 1989); pp. 114-118; vol. 61, No. 2; <doi: 10.1021/ac00177a007 >.

Coelho et al.; "Treatment of Petroleum Refinery Sourwater by Advanced Oxidation Processes"; Journal of Hazardous Materials; (Sep. 1, 2006); pp. 178-184; vol. 137, Issue 1; <doi: 10.1016/j.hazmat.2006.01.051 >.

Fischer; "Bildung Von Methylenblau als Reaktion Auf Schwefelwasserstoff;" Reports of the German Chemical Society; (1883); pp. 2234-2236; vol. 16, Issue 2; <doi: 10.1002/cber.188301602138 >; (Fischer; "Formation of Methylene Blue in Reaction to Hydrogen Sulfide"; Investigations from Different Fields).

Galardon et al.; "New Fluorescent Zinc Complexes: Towards Specific Sensors for Hydrogen Sulfide in Solution"; Dalton Transactions; (Sep. 2009); pp. 9126-9130; <doi: 10.1039/b907115f >.

Hartman et al.; "A New, Highly Water-Soluble, Fluorescent Turn-On Chemodosimeter for Direct Measurement of Hydrogen Sulfide in Biological Fluids"; The Analyst; (Sep. 2012); pp. 4910-4912; vol. 137, No. 21; <doi: 10.1039/c2an35870k >.

Knight et al.; "Death by Sewer Gas: Case Report of a Double Fatality and review of the Literature"; The American Journal of Forensic Medicine and Pathology; (Jun. 2005); pp. 181-185; vol. 26, Issue 2; <doi: 10.1097/01.paf.0000163834.87968.08 >.

Kolluru et al; "A Tale of Two Gases: NO and $H^2S^1$ Foes or Friends for Life?"; Redox Biology; (2013); pp. 313-318; <doi: 10.1016/j.redox.2013.05.001 >.

Letterman et al.; Water Quality and Treatment: A Handbook of Community Water Supplies; (1999); 140 pages; Fifth Edition.

Lin et al.; "Fluorescent Probes for Sensing and Imaging Biological Hydrogen Sulfide"; Current Opinion in Chemical Biology; (Dec. 2012); pp. 595-601; vol. 16(5-6); <doi: 10.1016/j.cbpa.2012.07.014 >.

Lippert et al.; "Reaction-Based Fluorescent Probes for Selective Imaging of Hydrogen Sulfide in Living Cells"; Journal of the American Chemical Society; (Jun. 2011); pp. 10078-10080; vol. 133(26); <doi: 10.1021/ja203661J >.

Liu et al.; "A Lysosome-Targetable Fluorescent Probe for Imaging Hydrogen sulfide in Living Cells"; Organic Letters; (Apr. 2013); pp. 2011-2014; vol. 15(9); <doi: 10.1021/ol400973v >.

Muller; "Luminescent Chiral Lanthanide (III) Complexes as Potential Molecular Probes"; Dalton Transactions; (Jul. 27, 2009); pp. 9692-9707; Issue 44.

Srivastava; "An Evaluation of Desulfurization Technologies for Sulfur Removal from Liquid Fuels"; The Royal Society of Chemistry Advances; (2012); pp. 759-783; Issue 2; <doi: 10.1039/C1RA00309G >.

Szabó; "Hydrogen Sulphide and its Therapeutic Potential"; Nature Reviews Drug Discovery; (Nov. 1, 2007); pp. 917-935; vol. 6.

Thorson et al.; "Identification of Cystathionine-Synthase Inhibitors Using a Hydrogen Sulfide Selective Probe"; Angewandte Chemie International Edition; (Apr. 2013); pp. 4641-4644; vol. 52, No. 17; <doi: 10.1002/anie.201300841 >.

Tropiano et al.; "A Lanthanide Based Sensor for the Time-Gated Detection of Hydrogen Sulfide"; ChemComm; (Jan. 2014); pp. 4696-4698; vol. 50, No. 36; <doi: 10.1039/C4CC01095G >.

Yuan et al.; "Lanthanide-Based Luminescence Probes and Time-Resolved Luminescence Bioassays"; TrAC Trends in Analytical Chemistry; (May 2006); pp. 490-500; vol. 25, Issue 5; <doi: 10.1016/j.trac.2005.11.013 >.

Extended European Search Report dated Jun. 20, 2018, in EP Application No. 15834474.7, filed Aug. 18, 2015; 10 pages.

* cited by examiner

CHEMICAL PROBES FOR HYDROGEN SULFIDE

RELATED APPLICATIONS

This application is the U.S. National Stage filing under 35 U.S.C. § 371 of International Patent Application No. PCT/US2015/045676, filed on Aug. 18, 2015 and titled CHEMICAL PROBES FOR HYDROGEN SULFIDE, which claims the benefit of U.S. Provisional Application No. 62/040,330, filed on Aug. 21, 2014 and titled CHEMICAL PROBES FOR HYDROGEN SULFIDE, each of which is incorporated herein by reference in its entirety.

TECHNICAL FIELD

This application generally relates to chemical probes and their use in methods for the detection and/or quantification of hydrogen sulfide ($H_2S$) in industrial and environmental fluids and effluents, including crude oil and sour water produced by petrochemical and other industrial processes.

BACKGROUND $H_2S$ is notorious for its noxious smell and toxicity. Despite this negative notoriety, $H_2S$ plays key roles in cellular signaling pathways and is critical for maintaining vascular and neurological health (Szabó, C. *Nat. Rev. Drug Discov.* 2007, 6, 917-935). Moreover, $H_2S$ is also ubiquitous in the environment. The gaseous molecule is a major contaminant in crude oil (Chandra Srivastava, V. *RSC Adv.* 2012, 2, 759) and ground water (Supplies, W. *WATER QUALITY AND TREATMENT A Handbook of Community;* 1999; Vol. 331, p. xiv, 1194 p.) and presents a significant occupational hazard in a variety of work environments (Knight, L. D.; Presnell, S. E. *Death by sewer gas: case report of a double fatality and review of the literature.;* 2005; Vol. 26, pp. 181-185). Due to the industrial, environmental and biological importance of $H_2S$ and related sulfides, there has been significant interest in the development of chemical approaches for monitoring and measuring its presence.

Traditional approaches to $H_2S$ detection include the methylene blue assay first reported by Emil Fischer in the late 1800's (Fischer, E. *Berichte der Dtsch. Chem. Gesellschaft* 1883, 16, 2234-2236), qualitative analysis of sulfide by precipitation with lead acetate (Caron, F.; Kramer, J. R. *Anal. Chem.* 1989, 61, 114-118), the use of a sulfide ion selective electrode (Hartman, M. *Analyst.* 2012, 137, 4910-4912), and gas chromatography (Liu, T.; Xu, Z.; Spring, D. R.; Cui, J. 2013, 2011-2014). Unfortunately, the methylene blue method is not sensitive at concentrations below 10 µM and therefore cannot be used for many applications requiring detection or quantification of $H_2S$ at these low concentrations.

Due to the recent discovery of the biological roles of $H_2S$, a number of fluorogenic probes for $H_2S$ have been developed (e.g., Galardon, E.; Tomas, A.; Roussel, P.; Artaud, I. *Dalton Trans.* 2009, 9126-9130). These probes generally rely on sulfide-specific chemistries; most notably the sulfide-selective reduction of an aryl azide or nitro group to form an aryl amine with concomitant increase in a fluorescent signal (Lin, V. S.; Chang, C. J. *Curr. Opin. Chem. Biol.* 2012, 16, 595-601; Lippert, A. R.; New, E. J.; Chang, C. J. *J. Am. Chem. Soc.* 2011, 133, 10078-10080).

While these reaction-based probes offer significant advantages over other approaches to monitoring $H_2S$, including a sensitive fluorogenic signal and a direct and facile assay for the presence of $H_2S$, they have not been widely applied to industrially or environmentally relevant samples. In addition, the excitation and/or emission profiles of existing $H_2S$ probes often overlap with small molecule absorbance and fluorescence and tissue autofluorescence (Kolluru, G. K.; Shen, X.; Bir, S. C.; Kevil, C. G. *Nitric Oxide* 2013, 35, 5-20; Yuan, J.; Wang, G. *TrAC Trends Anal. Chem.* 2006, 25, 490-500). One way to overcome this difficulty is to utilize fluorogenic probes with a long luminescent lifetime (Muller, G. *Dalton Trans.* 2009, 9692-9707) that allow for time-gated fluorescence studies. By allowing the background (organic) fluorescence to decay before a signal is read, the signal-to-noise ratio is improved greatly. This enables these probes to have utility in scenarios where other fluorescent probes may fail to produce a reliable signal.

In view of the above, there is a clear need for new $H_2S$ probes and methods for detecting and/or quantifying $H_2S$ and related sulfides, particularly in industrial and environmental samples and effluents, such as in crude oil and in sour water produced by petrochemical and other industrial processes.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
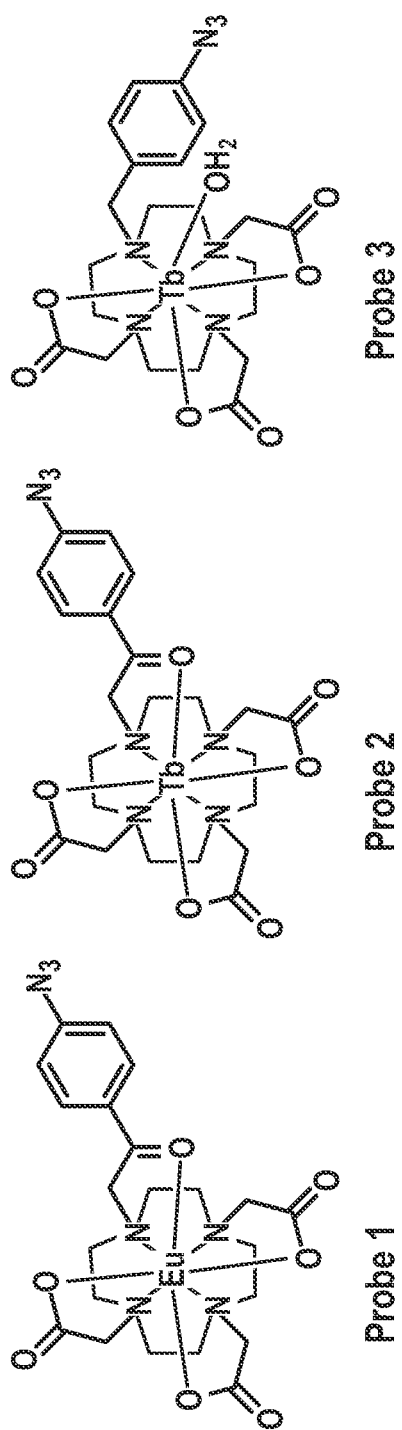
FIG. 1 depicts the structures of three $H_2S$-responsive lanthanide probe compounds (Probes 1, 2, and 3).

This disclosure relates to reagents, methods and systems for detecting and/or determining the concentration of $H_2S$, and particularly for detecting and/or determining the concentration of $H_2S$ in industrial and environmental fluids and effluents, such as in crude or in sour water produced by petrochemical and other industrial processes. It will be readily understood that the embodiments, as generally described herein, are exemplary. The following more detailed description of various embodiments is not intended to limit the scope of the present disclosure, but is merely representative of various embodiments. Moreover, the order of the steps or actions of the methods disclosed herein may be changed by those skilled in the art without departing from the scope of the present disclosure. In other words, unless a specific order of steps or actions is required for proper operation of the embodiment, the order of specific steps or actions may be modified.

As used herein, the term "sour water," when used with reference to an industrial water sample, refers to wastewater that is produced from atmospheric pressure and vacuum crude oil columns at oil refineries, and other petrochemical or industrial processes. $H_2S$ and ammonia are typical components in sour water that must be removed before the water can be reused elsewhere in the plant or released into the environment.

As used herein, the term "crude oil," refers to a petroleum product prior to refinement and fractionation into its constituent components by a petrochemical process.

As used herein, the term "petrochemical process," when used with reference to an industrial process, refers to a process that is conducted on crude oil or a component thereof.

As used herein, the term "$H_2S$-responsive probe compound," or simply "probe compound" or "probe," when used in reference to the reagents and methods disclosed herein, refers to a chemical compound that is (a) chemically altered through a specific reaction with $H_2S$, and (b) can be detected once altered by that specific reaction with $H_2S$. In some embodiments the detection of the chemically altered "$H_2S$-responsive probe compound," "probe compound" or "probe," is by fluorometric means. In other embodiments the detection of the chemically altered "$H_2S$-responsive probe compound," "probe compound" or "probe," is by colorimetric means.

As used herein, the term "AzMC," when used in reference to $H_2S$-responsive probe compounds, refers to the nonfluorescent 7-azido-4-methylcoumarin. The term "AMC" refers to the fluorescent 7-amino-4-methylcoumarin produced by the $H_2S$-specific reduction of the azide group on AzMC.

The methods and systems described below may permit the detection and/or quantification of $H_2S$ via fluorometric and/or colorimetric procedures. More particularly, the methods and systems described below may be used to detect and/or quantify $H_2S$ in industrial fluids and effluents, including, but not limited to, crude oil and sour water produced by petrochemical and other industrial processes. The methods and systems described below may be used to detect and/or quantify $H_2S$ in environmental fluids and effluents, including, but not limited to, discharge streams from petrochemical plants and samples taken from natural water bodies such as rivers, lakes, streams, and springs, and also from wells and other water supplies.

In some embodiments, the probe compounds and methods disclosed herein are adapted to, and utilized with, kits for the detection and/or quantification of $H_2S$. In particular embodiments the kits for detection and/or quantification of $H_2S$ are configured for use with a particular type of sample to be assayed. In such embodiments, the sample to be assayed can be selected from crude oil, sour water, industrial wastewater, industrial effluents, environmental water samples, etc.

In some embodiments the kits utilizing the probe compounds and methods disclosed herein are designed for detection of $H_2S$ by fluorometric procedures. In these embodiments, a sample prepared with the regents or components of the kit is eventually be analyzed in a fluorometer, or similar device. In other embodiments the kits utilizing the probe compounds and methods disclosed herein are designed for detection of $H_2S$ by colorimetric procedures. In these embodiments, a sample prepared with the regents or components of the kit may eventually be analyzed in a spectrophotometer, or similar device.

In some embodiments the kits utilizing the probe compounds and methods disclosed herein are designed for detection of $H_2S$ by procedures not requiring instruments, such as fluorometers or spectrophotometers. In some embodiments, the kits utilizing the probe compounds and methods disclosed herein are designed to provide a readily perceptible visual readout that can be detected with normal human vision. In some sub-embodiments the readily perceptible visual readout can be a change in color of a test solution or a test paper containing a particular probe compound. In other sub-embodiments the readily perceptible visual readout can be a change in the intensity of a particular color of a test solution or a test paper comprising a test compound. In all of such embodiments reference samples can be provided with the kit, wherein the reference samples facilitate the evaluation of the test solution or test paper and the interpretation of the results. For example, in those sub-embodiments of kits comprising test papers that are designed to exhibit increased intensity of a particular color of a test paper with increasing concentrations of $H_2S$ in the sample, the kits may contain a reference card or chart showing examples of increasing color intensity alongside corresponding concentrations (or concentration ranges) of $H_2S$ expected to result in that particular color intensity.

In some embodiments the methods and kits disclosed are optimized for use in detecting and/or quantifying $H_2S$ in crude oil (i.e., petroleum) samples, or in samples of wastewater produced during the refinement of crude oil, such as sour water samples. In such embodiments, the methods and kits may be appropriately adapted for use with either aqueous or non-aqueous samples. In those embodiments designed for detecting and/or quantifying $H_2S$ in crude oil (i.e., petroleum) samples, a certain amount of pre-analysis preparation may be required to facilitate analysis with one of the disclosed $H_2S$-responsive probe compounds. In such embodiments, a kit may contain the appropriate reagents required for the pre-analysis preparation of the sample. For example, in an embodiment designed to detect and or quantify $H_2S$ in samples of crude oil, the kit may contain the solvent, or solvents, and the container(s) required to conduct a liquid extraction of the $H_2S$ from a crude oil sample. In some embodiments the kit may optionally contain appropriate solvents that can be used to dissolve and mix non-aqueous samples with aqueous test reagent solutions.

Further, in some embodiments the methods and/or kits disclosed herein are designed for the rapid detection and/or quantification of $H_2S$ in a sample. In such embodiments, the methods may be designed for the detection and/or quantification of $H_2S$ in less than 2 hours. In some embodiments the methods are designed to detect and/or quantify $H_2S$ in less than 1 hour. In some other embodiments the methods may be designed for the detection and/or quantification of $H_2S$ in less than ½ hour. In still other embodiments the methods may be designed for the detection and/or quantification of $H_2S$ in less than about 10 minutes. In still other embodiments the methods may be designed for the detection and/or quantification of $H_2S$ in less than about 1 minute.

In particular embodiments the methods disclosed herein are designed for the detection and/or quantification of $H_2S$ found in concentrations in the mM range (i.e. about 1 mM to about 999.99 mM) in a sample being analyzed. In other or further embodiments the methods disclosed herein are designed for the detection and/or quantification of $H_2S$ found in concentrations in the μM range (i.e. about 1 μM to about 999.99 μM) in the sample being analyzed. In other or further embodiments the methods disclosed herein are designed for the detection and/or quantification of $H_2S$ found in concentrations in the nM range (i.e. about 1 nM to about 999.99 nM) in the sample being analyzed.

In particular embodiments, the methods disclosed herein are designed for the detection and/or quantification of $H_2S$ found in samples at concentrations below the olfactory detection limit, which is estimated at approx. 15 μM (Muller, G. *Dalton Trans.* 2009, 9692-9707).

Detection methods, techniques, and systems described herein may possess one or more advantages over detection/quantification techniques and systems known in the prior art. For example, the techniques disclosed herein may allow for the detection and/or quantification of $H_2S$ at lower concentrations than other techniques commonly practiced in the art. Similarly, the techniques disclosed herein may allow for the detection and/or quantification of $H_2S$ more rapidly than other techniques commonly practiced in the art. Moreover, the techniques disclosed herein may allow for the detection and/or quantification of $H_2S$ without the need for instruments such as fluorometers or spectrophotometers. Further, the detection systems disclosed herein may allow for the detection and/or quantification of $H_2S$ in crude oil, or in industrial wastewater, such as sour water produced during industrial processes such as the refining of crude oil. Such methods, techniques, and systems may allow for the detection and/or quantification of $H_2S$ more rapidly, easily, and/or inexpensively than other known techniques. Such methods, techniques, and systems may be adapted for spot-checking oil or wastewater samples, or routinely monitoring wastewater streams and industrial effluents. Such methods, techniques, and systems may be used to determine whether treated sour water or effluents have concentrations of $H_2S$ that aresufficiently low for the wastewater to be used in other industrial processes, or to be released into the environment.

The following examples are provided to further illustrate these embodiments. These examples are not intended to limit the scope of the claimed invention.

EXAMPLES

General Considerations.

All chemicals were purchased from commercial sources and used as received unless indicated otherwise. The $^1H$ NMR data was collected on a Varian 400 MHz NMR spectrometer (Varian, Inc., Palo Alto, Calif.). Chemical shifts are reported in parts per million referenced to an internal standard $((CH_3)_4Si=0.00$ ppm). Fluorescence and UV/Vis data were collected using a Molecular Devices Spectra Max M5 plate reader (Molecular Devices, Inc., Sunnyvale, Calif.). Lanthanide probes were supplied by the laboratory of Dr. Bim Graham.

Example 1—Lanthanide-Based Probes

Materials and Methods for Lanthanide-Based $H_2S$-Responsive Probes

Screening of Lanthanide-Based Probes.

Eight lanthanide probes containing an azide functional group were screened for reactivity with hydrogen sulfide. Probe fluorescence was determined both with and without 100 μM NaHS in buffer (200 mM Tris HCl, pH 8). Time-resolved fluorescence was performed using a 500 μs delay and integrating over 1000 μs. Probes were excited at both 270 and 360 nm. All probes were soluble in buffer with the exception of probe 3 which was dissolved in DMSO.

NaHS Dependence of Compounds 1, 2, and 3.

A final concentration of 10 μM of each compound was used in buffer (200 mM Tris HCl, pH 8.0) and 5% DMSO. Optimal excitation of each probe was determined by observing the emission fluorescence at 545 nm or 615 nm while varying the excitation wavelength both in the absence and presence of 250 μM NaHS (delay: 500 μs, integration: 1000 μs).

NaHS Dependence of Compound 3.

Varying concentrations of NaHS were reacted with 10 μM compound 3 in buffer with 5% DMSO used to dissolve the compound.

Sour Water Studied.

Known concentrations of NaHS (0-300 μM) were created and used to make standard curves for all three assays. The sour water was diluted sequentially to create a dilution within the workable range of all assays. For compound 3 and AzMC, 10 μM of probe in buffer and 5% DMSO was incubated with known NaHS solution for thirty minutes prior to detection. The standard methylene blue protocol was used for validation. Briefly, a 70 μL aliquot of known NaHS concentration was reacted with 60 μL 10% w/v trichloroacetic acid, 30 μL 1% w/v zinc acetate (aq), and 20 μL 30 mM ferric chloride (in 1.2 M HCl). Addition of 20 μL 20 mM N,N-dimethyl-p-phenylenediamine sulfate (in 7.2 M HCl) yielded a blue color which was detected after 30 minutes at 670 nm.

Initial Studies with Compound 1 in Crude Oil #4.

In 200 μL total solution was placed 10 μL buffer, 10 μL 0.2 mM probe in DMSO (10 μM final concentration) and either 10 μL "control" or "HS." Because of limited NaHS solubility in buffer, an alternative form of hydrogen sulfide was used for these initial experiments. The liquor of inorganic sulfur pieces suspended in DMSO was combined with β-mercaptoethanol (BME) (7 μL BME in 1 mL total solution) to produce "HS." To control for the DMSO and BME, a "control" was added to non-sulfide containing wells. The "control" solution was identical to the "HS," but contained pure DMSO. The "HS" solution was later determined to have a concentration of 25±3 mM hydrogen sulfide using the AzMC assay in buffer. The solutions were incubated for 30 minutes prior to fluorescence determination. Maximal emission (615 nm) was seen at an excitation of 360 nm after a 500 μs delay and 1000 μs integration.

Initial Studies with Compound 3 in Crude Oil #4.

In 200 µL total solution was placed 10 µL buffer, 50 µL 0.2 mM probe in DMSO (10 µM final concentration) and either 50 µL "control" or "HS." See NaHS Dependence of Compounds 1 and 3 in Crude oil #4, below, for solution definitions. Compound 3 gives a maximal emission at 545 nm when excited at 280 nm during time-resolve fluorescence studies.

NaHS Dependence of Compounds 1 and 3 in Crude Oil #4.

The response of compound 1 in crude oil was determined in an analogous manner to the initial studies with Compound 3, as reported above. A 10 µL aliquot of probe (10 µM final concentration) in DMSO was added to 10 µL crude oil and 10 µL buffer in dioxane. However, because a much lower concentration of hydrogen sulfide was desired, the buffer was used to dissolve varying amounts of NaHS. The same experiment was conducted without oil as a control. Compound 1 was excited at 360 nm and the emission was read at 615 nm following a 500 µs delay and 1000 µs integration. Compound 3 was excited at 280 nm to give a signal at 545 nm.

Results and Discussion of Lanthanide-Based $H_2S$-Responsive Probes

Lanthanide-Based Probes and their Reactivity.

A small series of lanthanide-based probes was studied for reactivity with hydrogen sulfide (data not shown). Interestingly, compound 1 has been previously reported as a europium-based $H_2S$-selective probe (Tropiano, M.; Faulkner, S. Chem. Commun. (Camb). 2014, 50, 4696-4698), showing a linear response to $H_2S$ in the concentration range between 80 nM and 1 µM in water or blood serum (Ibid). Of the eight compounds in the tested series, three displayed a response upon the addition of 250 µM $H_2S$.

Figure 2A:
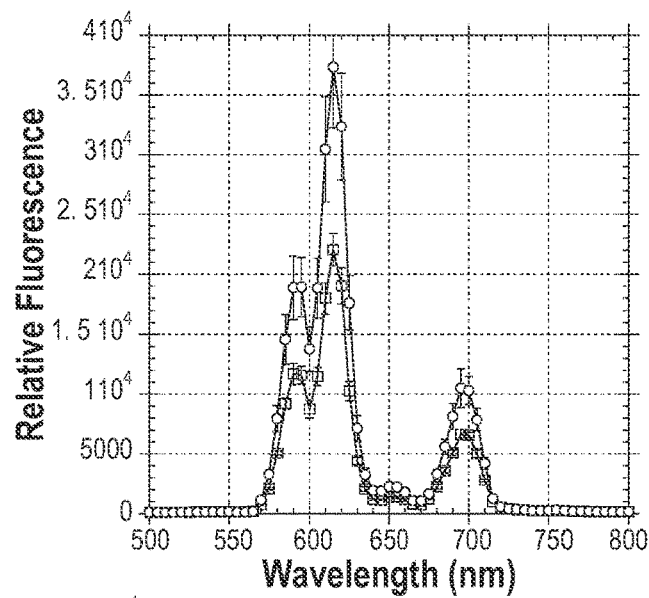
FIGS. 2A, 2B, and 2C are graphs depicting the response of probe compounds 1, 2, and 3, respectively, to 250 µM NaHS. Open circles indicate the presence of NaHS while open squares represent background fluorescence in the absence of sulfide.
Figure 2B:
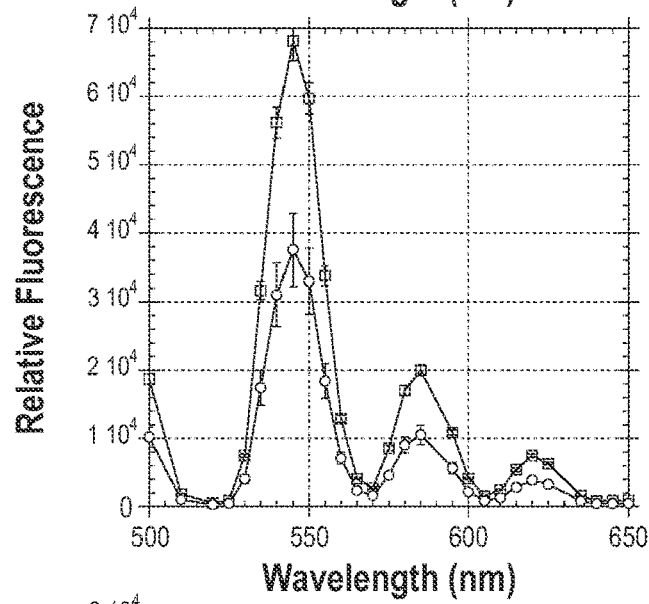
Figure 2C:
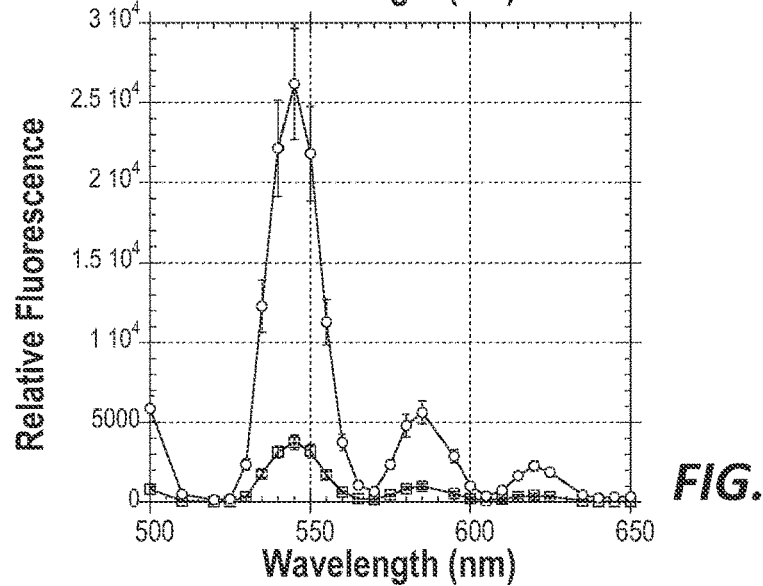
Figure 3:
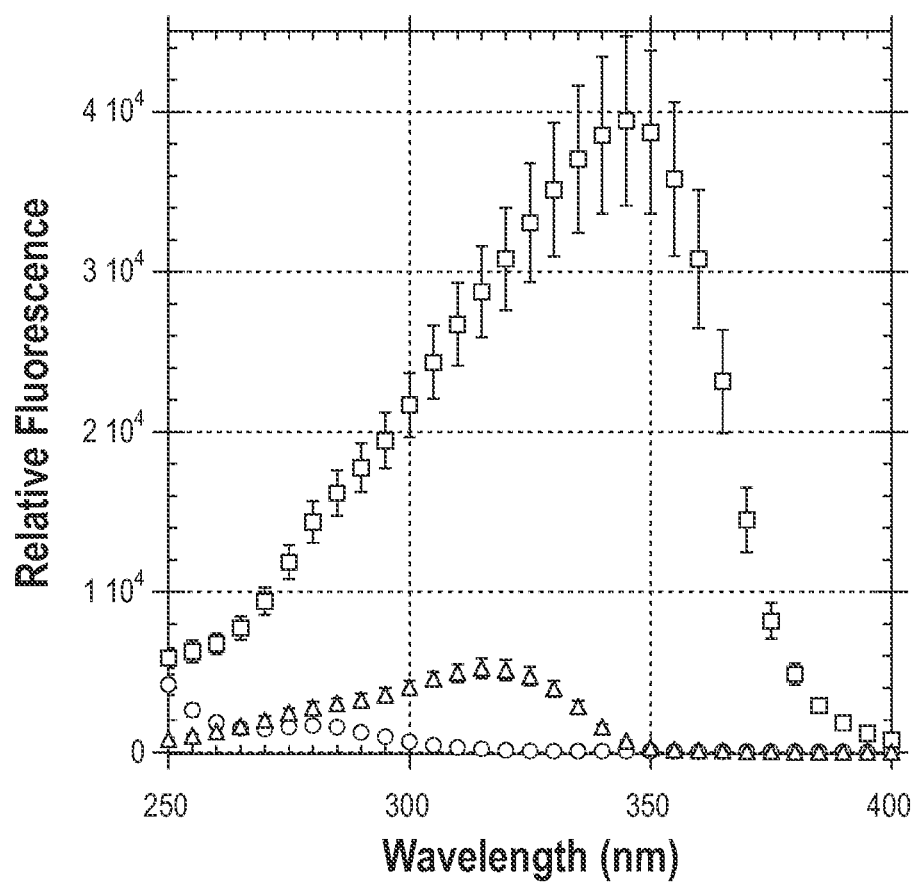
FIG. 3 is a graph depicting the excitation sweep of 10 µM probe compounds 1-3, in the presence of 250 µM NaHS, with the emission read at 615 nm. Probe 1 is shown as in open triangles. Probe 2 is shown in open squares. Probe 3 is shown in open circles.

The emission profiles of each compound in the absence and presence of 250 µM $H_2S$ are displayed in FIGS. 2A-2C. Probe compounds 1 (FIG. 2A) and 3 (FIG. 2C), upon excitation at 280 nm and 350 nm, respectively, display increased fluorescence in the presence of $H_2S$. These compounds, especially probe 3, with an approximately 5-fold fluorescence increase (FIG. 2C), may be good "turn-on" fluorescent probes for $H_2S$. Upon excitation at 280 nm, probe compound 2 displays decreased fluorescence in the presence of $H_2S$ (FIG. 2B) and can be considered a "turn-off" probe of $H_2S$. Additionally, the $\lambda_{ex}$ values for probe compounds 1 and 2 (FIGS. 2A & 2B) are significantly red-shifted as compared to that of probe compound 3 (FIG. 2C), with significant absorbance above 300 nm. In contrast, probe compound 3 has little absorbance above 300 nm (FIG. 3).

Figure 4A:
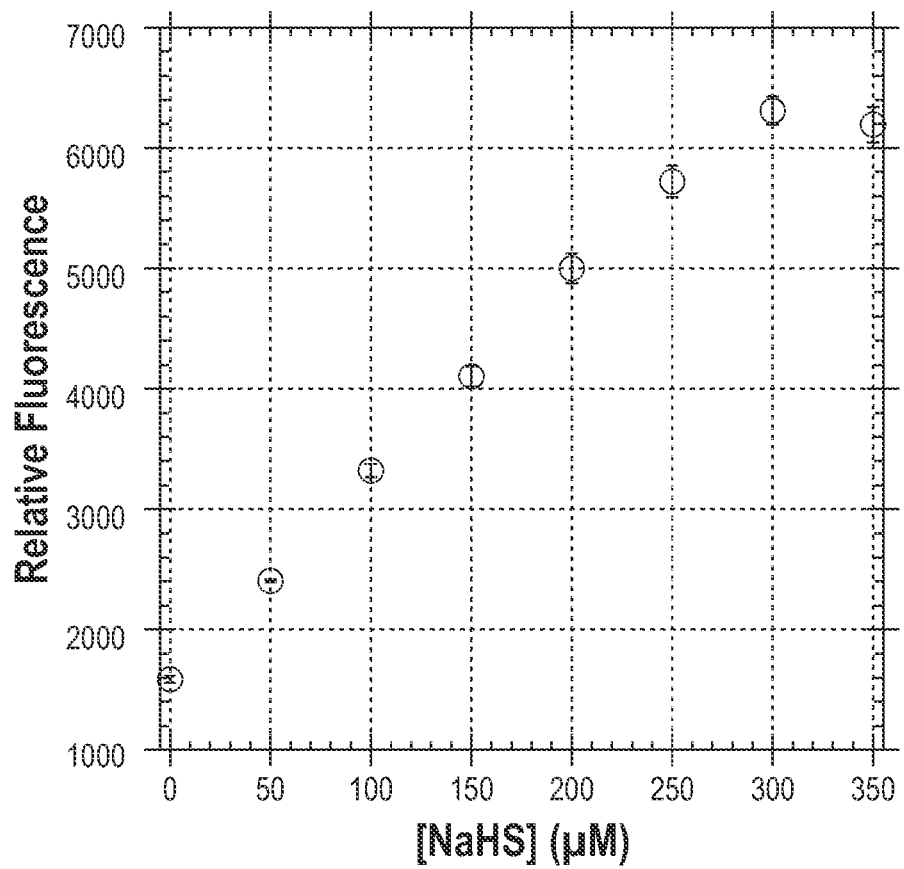
FIG. 4A and FIG. 4B are graphs depicting the dependence of fluorescence on the concentration of NaHS for probe compound 3 at µM concentrations (FIG. 4A) and nM concentrations (FIG. 4B).
Figure 4B:
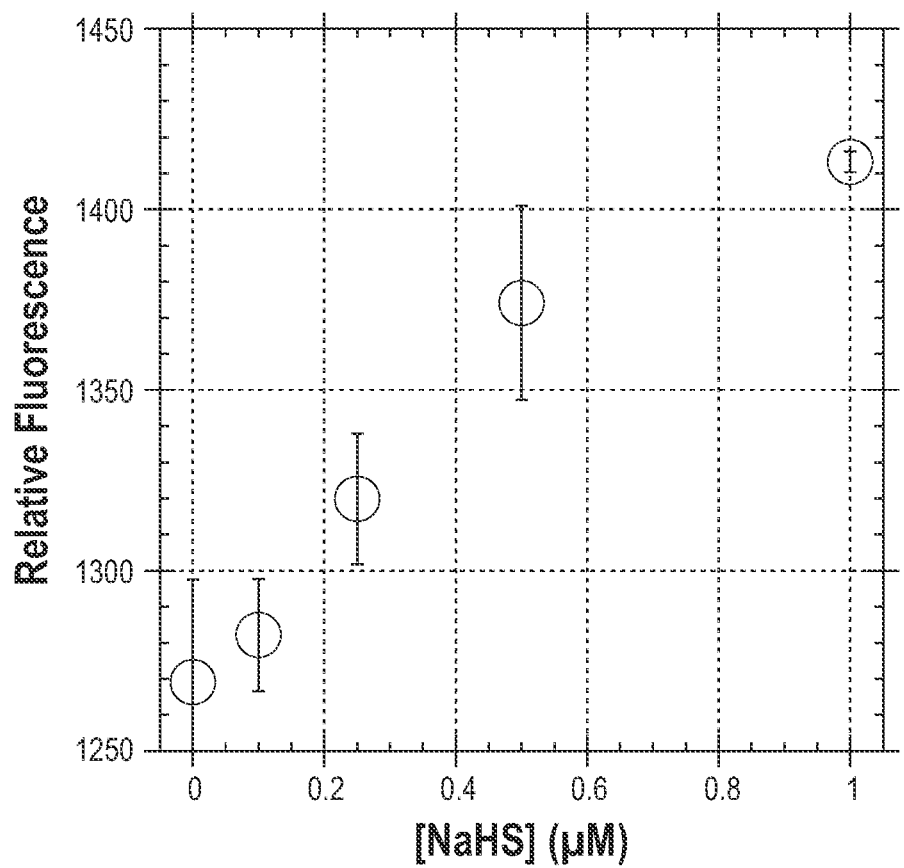

While probe compounds 1 and 3 both may serve as $H_2S$ sensors with significant time-delayed luminescence, the sensitivity of the probes along with their excitation profiles will likely influence their use. As shown in FIG. 4B, probe compound 3 could reliably detect $H_2S$ in concentrations as low as 250 nM in aqueous solutions with a linear working range from 1 to 300 µM $H_2S$ (FIGS. 4A and 4B). Because of its sensitivity, large working range, and UV excitation, this probe may be used to measure $H_2S$ levels in industrial wastewater samples with little background absorbance.

Hydrogen Sulfide Detection in Sour Water.

Large amounts of water are used in the process of refining crude oil and the industry generates significant volumes of wastewater (Coelho, A.; Castro, A. V; Dezotti, M.; Sant'Anna, G. L. J. Hazard. Mater. 2006, 137, 178-184). This wastewater (often called "sour water" because of its characteristic smell) contains large amounts of sulfide, ammonia and other petroleum byproducts. Before the water can be released into the environment or recycled in the refinery, it must be "stripped" of the toxic and corrosive byproducts. Specifically, the Environmental Protection Agency stipulates that the hydrogen sulfide in water released into the environment must be below the olfactory detection limit (estimated at approx. 15 µM [Muller, G. Dalton Trans. 2009, 9692-9707]).

Figure 5:
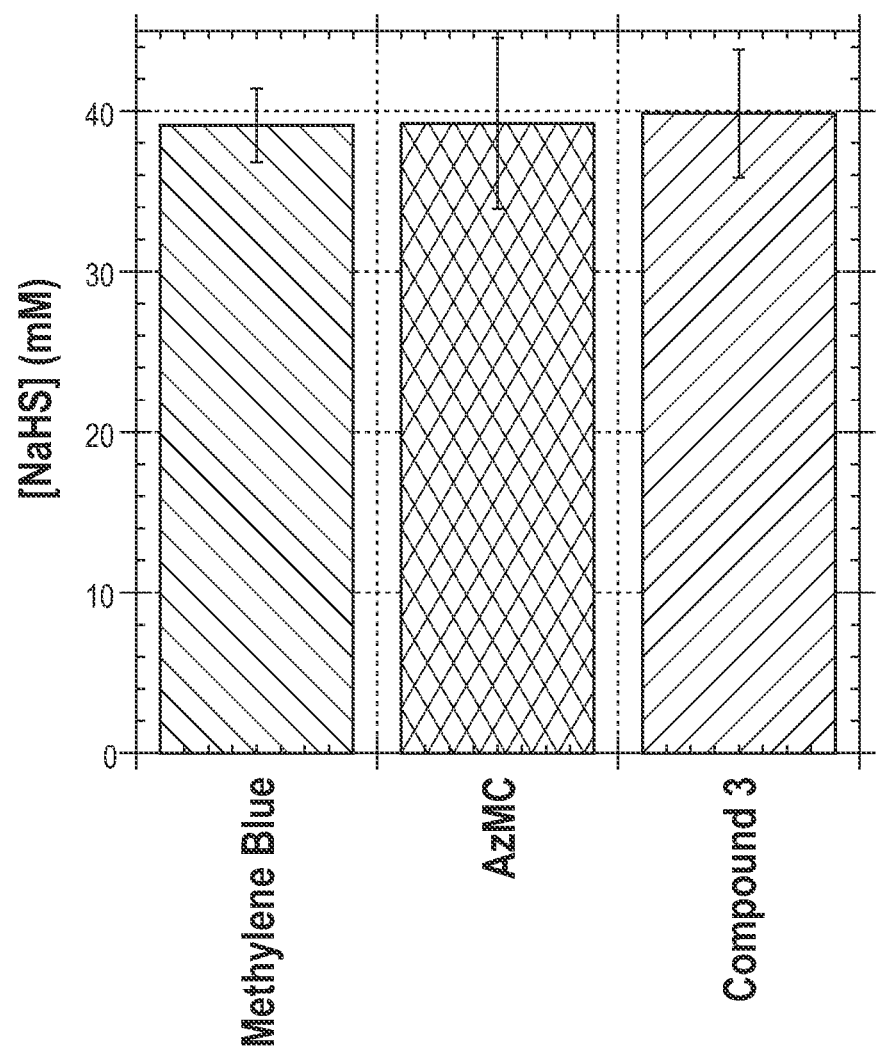
FIG. 5 is a bar chart depicting the detection of hydrogen sulfide in sour water using three independent assays: methylene blue, 7-azido-4-methylcoumarin (AzMC) and probe compound 3.

To validate the utility of probe compound 3 for detecting hydrogen sulfide in aqueous samples, we obtained samples of "sour" and "stripped" water from a local oil refinery. Using the standard curve shown in FIGS. 4A and 4B, we measured the concentration of $H_2S$ in these industrial water samples (FIG. 5). The sour water sample had a very high sulfide concentration of 40±4 mM as measured by probe 3. This measurement was independently verified using two proven quantitative tests for $H_2S$, the methylene blue test and a fluorescent probe previously developed in our laboratory (Fischer, E. Berichte der Dtsch. Chem. Gesellschaft 1883, 16, 2234-2236; Thorson, M. K.; Majtan, T.; Kraus, J. P.; Barrios, A. M. Angew. Chem. Int. Ed. Engl. 2013, 52, 4641-4644).

The stripped water sample had a significantly lower sulfide concentration of 3.0±0.4 µM as measured using probe 3 and verified using the coumarin-based probe, AzMC. The methylene blue method is not sensitive below 10 µM (data not shown) and therefore could not be used to further validate these results.

Detection of Hydrogen Sulfide in Crude Oil.

Figure 6:
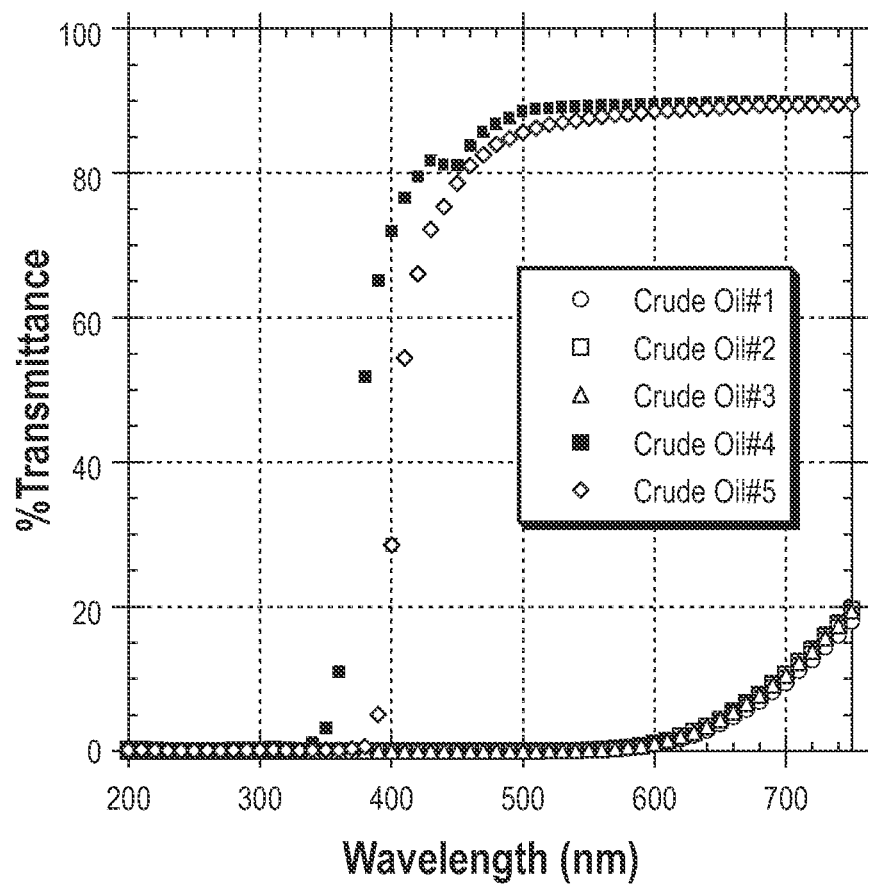
FIG. 6 is a graph depicting the UV/Vis spectra of 100 µL crude oil sample numbers (# s) 1-5 obtained from the Tesoro Refinery in Salt Lake City, Utah.

While hydrogen sulfide levels were readily detected in sour water, the detection of hydrogen sulfide in crude oil inherently poses more challenges. First, crude oil has considerable background fluorescence, a result of many contaminating hydrocarbons. This obstacle is easily overcome by use of time-resolved fluorescence studies as previously described. Second, crude oil has low light transmission, especially at wavelengths below 300 nm (FIG. 6). Low wavelengths are absorbed by the oil sample, making it is extremely difficult to excite a probe. Lastly, crude oil is not readily soluble in aqueous solutions. The reduction of azide-based probes by hydrogen sulfide, however, is a water dependent reaction; something difficult to reconcile within a crude oil sample.

Figure 7A:
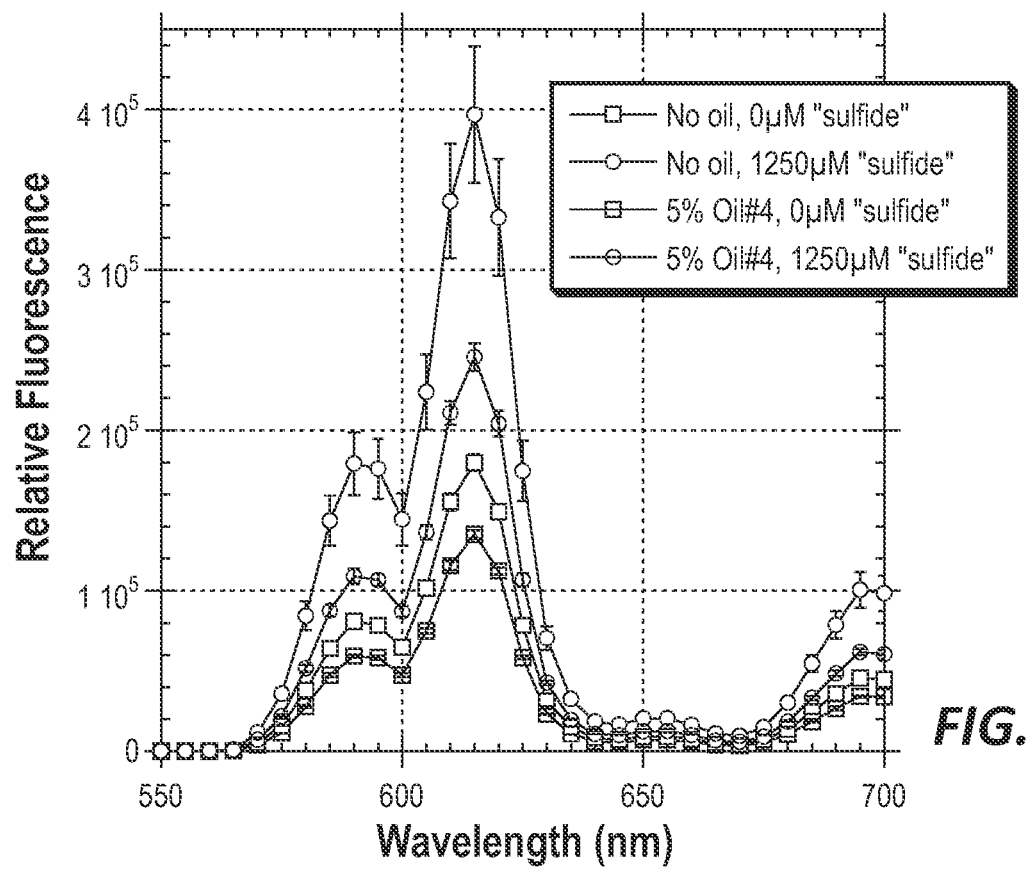
FIG. 7A is a graph depicting probe compound 1 in the presence and absence of oil #4, with and without added sulfide (1,250 µM).
Figure 7B:
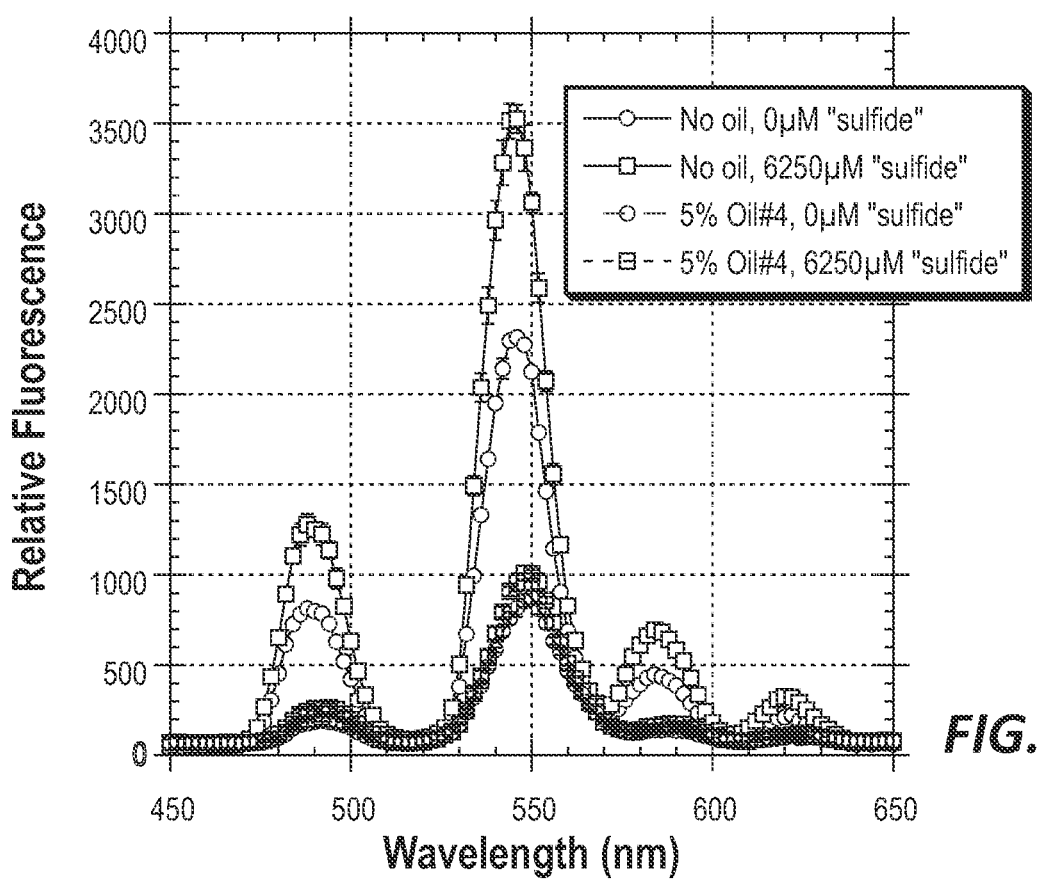
FIG. 7B is a graph depicting probe compound 3 in the presence and absence of oil #4, with and without added sulfide (6,250 µM).

Using dioxane for its ability to dissolve both oil and water, studies were undertaken with probe compound 3 to detect $H_2S$ in crude oil. The first of these studies attempted to detect $H_2S$ in 5% crude oil #4. While a significant increase in signal was seen in dioxane alone, the addition of oil decreased this signal drastically (FIG. 7B). Consequently, subsequent studies made use of probe compound 1. Compared to probe compound 3, probe compound 1 has the advantage of a higher excitation wavelength and compatibility with industrial oil samples, although it was not as sensitive as probe compound 3 in buffer. In view of this, it was predicted that this compound would prove more useful in samples with a high background absorbance and fluorescence. Indeed, a significant increase was seen in the presence of crude oil #4 (FIG. 7A) as a result of the higher excitation wavelength. In fact, probe compound 1 was able to detect added NaHS is the darkest crude oil sample, oils #1-3 (data not shown).

Figure 8:
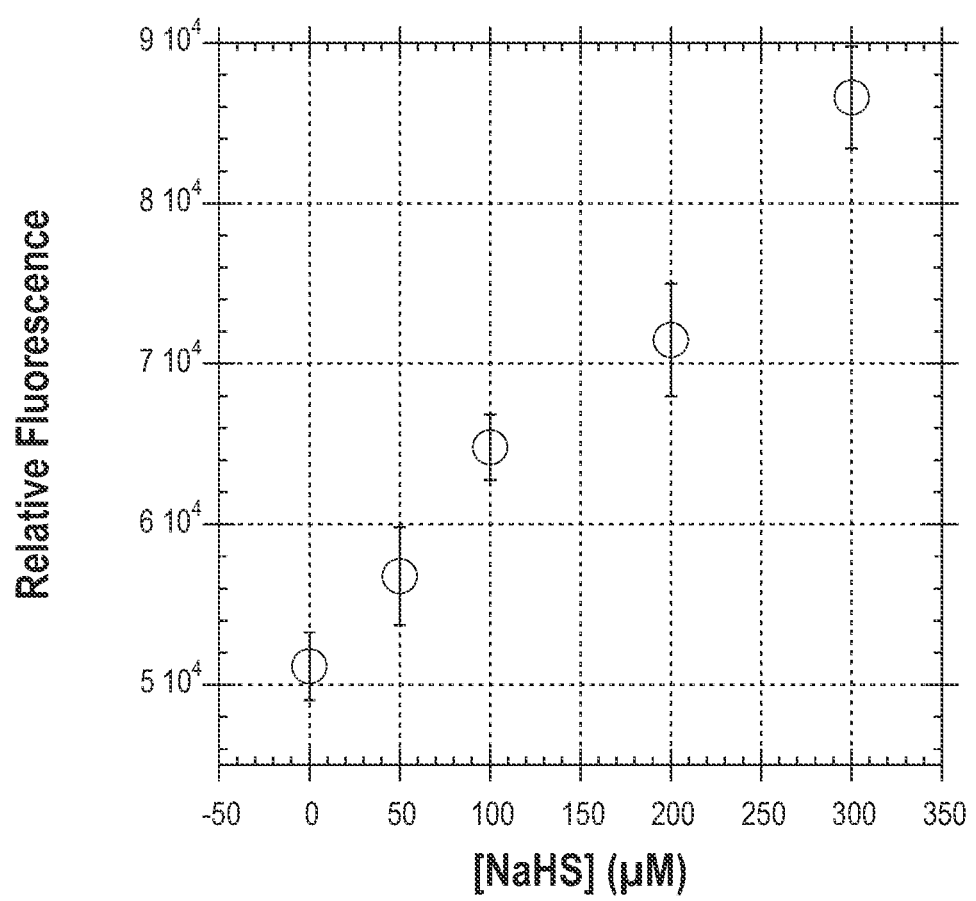
FIG. 8 is a graph depicting the dependence of fluorescence on the concentration of NaHS for 10 µM probe compound 1 in the presence of 5% crude oil #4 in dioxane.

After validating the usefulness of probe compound 1 in crude oil, we also tested the linear working range for probe compound 1 in 5% crude oil #4 with additional NaHS. We found the range to be similar to that in buffer; namely, additional NaHS was detected up to 300 µM (FIG. 8).

Example 2—Colorimetric Hydrogen Sulfide Probes

Figure 9A:
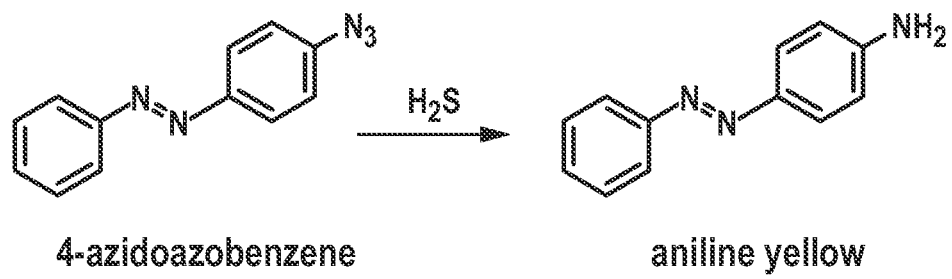
FIG. 9A depicts the selective reduction of 4-azidoazobenzene by hydrogen sulfide to produce aniline yellow.

As a compliment to the fluorescent probes, a colorimetric hydrogen sulfide-selective probe was also desired. Theoretically, a probe with a strong visual response would have use not only in industry but also to the general public. While only specialists possess the proper instrumentation to detect hydrogen sulfide via a fluorescent signal, most everyone can detect a visual change, for example from colorless to pink. Such probes could be used to detect hydrogen sulfide contaminating ground or drinking water, or they could have use in the petrochemical industry. As described previously, hydrogen sulfide is readily dissolved in both oil and water. An aqueous solution containing a colorimetric probe could be shaken with a very dark oil and the color detected upon separation of the two phases. To this end, we have prepared the azide-derivative of aniline yellow, 4-azidoazobenzene (FIG. 9A).

Materials and Methods for Colorimetric $H_2S$-Responsive Probes 4-azidoazobenzene was synthesized in an analogous manner to AzMC and AzCC.

Synthesis of 4-Azidoazobenzene.

4-azidoazobenzene was synthesized in an analogous fashion to our previous azide-based probes. Aniline yellow (1.2 g, 1 equiv) was placed in water (25 mL) and allowed to stir at 0° C. in an ice/water bath. Concentrated sulfuric acid (6 mL) was added to the reaction in a dropwise fashion to maintain the temperature. Sodium nitrate (0.55 g, 1.3 equiv) was dissolved in water (7 mL), cooled to 0° C., and added dropwise to the reaction over 10 min. The reaction was then allowed to stir at 0° C. for one hour. Meanwhile, sodium azide (0.67 g, 1.6 equiv) was dissolved in water (5 mL) and cooled to 0° C. After one hour, the sodium azide solution was added to the reaction mixture in a dropwise fashion and the formation of a red-orange precipitate was immediately observed. The reaction mixture was then allowed to warm to room temperature overnight with stirring and the solid was collected using vacuum filtration and washed with water (150 mL). The resulting solid was then dissolved in chloroform (200 mL) and ethyl acetate (100 mL), dried over anhydrous magnesium sulfate, filtered, and the solvent removed to yield a dark powder. The powder was dissolved in ethyl acetate (40 mL), washed with 3×20 mL 0.5 N HCl, and the organics were further washed with 2×20 mL brine solution. The organics were collected, dried over anhydrous sodium sulfate, and concentrated. The concentrated solution was purified on a silica column, eluting with 1:5 ethyl acetate:hexane before being further purified on a silica column eluting with hexanes. The resulting solid was pure product (0.917 g) in 65.5% yield. $^1$H NMR (δ, $(CD_3)_2SO$) 7.335 (d, 2H), 7.578 (m, 3H), 7.871 (d, 2H), 7.937 (d, 2H).

Results and Discussion of Colorimetric $H_2S$-Responsive Probes

Reactivity of 4-Azidoazobenzene.

4-azidobenzene (100 µM) was reacted with NaHS (0-200 mM) in 200 µL total volume buffer with 5% DMSO used to dissolve the probe. 200 µM NaHS was not enough to produce a visual change. 7-aminoazobenzene showed no response to large concentrations of NaHS.

Figure 9B:
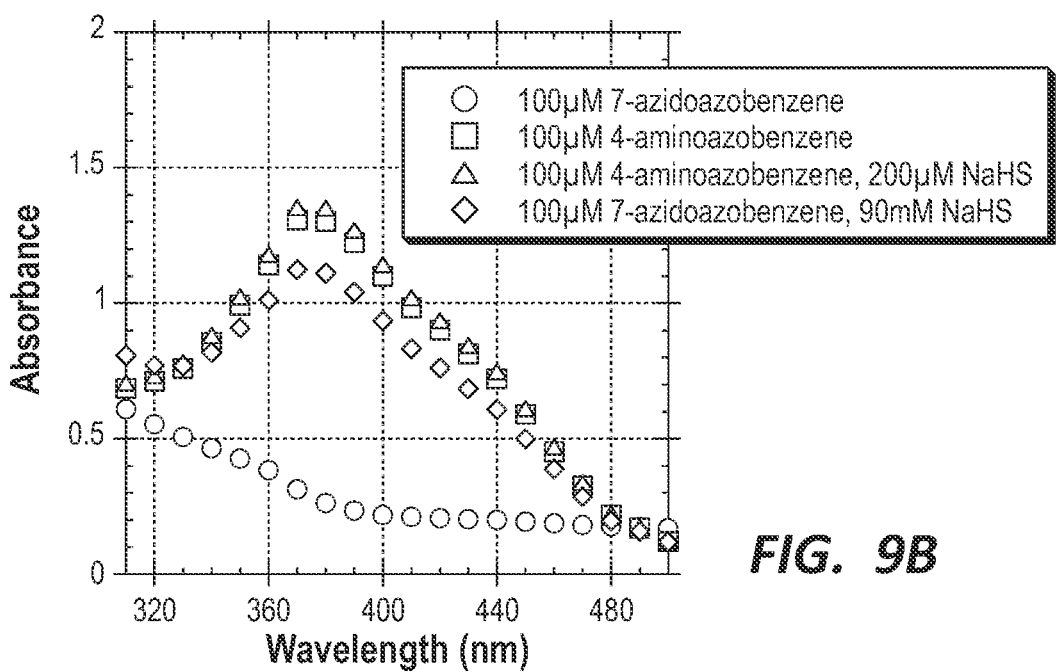
FIG. 9B is a graph depicting the absorbance spectra of 4-azidoazobenzene and 7-azidoazobenzene in the presence and absence of NaHS. (Aniline yellow does not react with NaHS, while the azide of 4-azidoazobenzene and 7-azidoazobenzene reacts to form the amine, giving a yellow color with a $\lambda_{max}$=370 nm.)
Figure 9C:
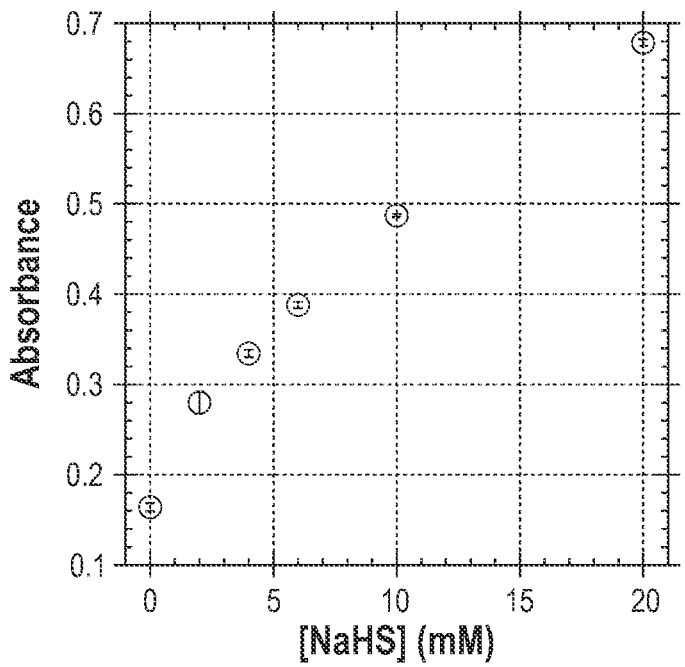
FIG. 9C is a graph depicting the dependence of absorbance at 370 nm on the concentration of NaHS, wherein the increased absorbance results from the production of aniline yellow by $H_2S$-specific reduction of the aryl azide of 4-azidoazobenzene.

When dissolved in buffer (with the aid of DMSO), 4-azidoazobenzene is pale yellow in color; however, addition of millimolar concentrations of NaHS results in a bright yellow solution. The absorbance spectra of this solution is similar to that of the parent 4-aminoazobenzene (aniline yellow) (FIG. 9B). Additionally, the yellow color shows a dose-dependent response to NaHS (FIG. 9C).

While not as sensitive as the fluorescent lanthanide-based probes or the colorimetric methylene blue assay, 4-azidoazobenzene is an example of a probe for use in a simple, colorimetric assay for $H_2S$. It provides a read-out capable of being read by almost anyone and involves fewer components and safer reaction conditions than methylene blue.

CONCLUSION

In conclusion, described herein is a series of lanthanide complexes that exhibit $H_2S$-sensitive fluorescence. These complexes have significant utility in measuring $H_2S$ levels in samples from the petroleum industry. In particular, probe compound 3 has a detection limit of about 250 nM $H_2S$ in aqueous solutions, making it superior to both the methylene blue assay (with a detection limit around 3 µM $H_2S$ [Muller, G. *Dalton Trans.* 2009, 9692-9707; Montoya, L. A.; Pearce, T. F.; Hansen, R. J.; Zakharov, L. N.; Pluth, M. D. 2013]) and the industry-standard ion selective electrode protocol (detection limit of 1.2 µM [Hartman, M. *Analyst.* 2012, 137, 4910-4912]) in terms of sensitivity. Probe compound 1, while less sensitive than probe compound 3, has the advantage of a higher excitation wavelength and could be used in monitoring sulfide levels in crude oil samples. Finally, 4-azidoazobenze is one example of a colorimetric hydrogen sulfide-sensitive probe that could be employed for the detection of $H_2S$ in aqueous solutions, such as sour water, or $H_2S$ in crude oil samples.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure, that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. A method of detecting hydrogen sulfide (H2S) in a sample, the method comprising:
   (A) providing a fixed volume of a sample;
   (B) optionally combining a fixed volume of a suitable solvent with the fixed volume of the sample to create a diluted sample;
   (C) adding a fixed amount of an $H_2S$-responsive fluorescent probe compound to the sample or the diluted sample, wherein either (1) the sample is non-aqueous and the $H_2S$-responsive fluorescent probe compound is Probe 1:

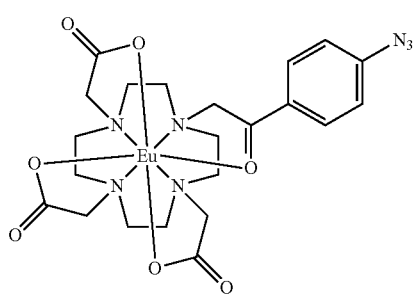

Probe 1 or (2) the sample is aqueous or non-aqueous and the $H_2S$-responsive fluorescent probe is Probe 2 or Probe 3:

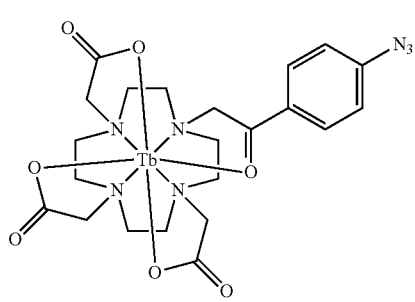

Probe 2

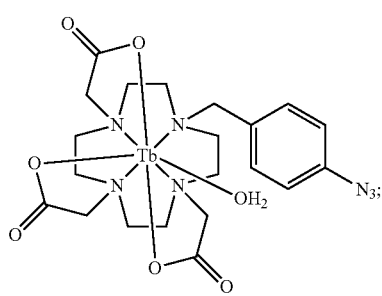

Probe 3

(D) mixing the combination of (C) and incubating the mixture for a suitable time;
(E) exciting the $H_2S$-responsive fluorescent probe compound in the mixed and incubated combination of (D) with a suitable wavelength of light;
(F) recording the fluorescent emission of the $H_2S$-responsive fluorescent probe compound at a suitable wavelength following a suitable delay and integration period; and
(G) determining whether or not the intensity of the fluorescent emission of the $H_2S$-responsive fluorescent probe compound is greater than a threshold value that corresponds to the detection limit of the method.

2. A method of quantifying $H_2S$ in a sample, the method comprising:
   (1) conducting the method of claim 1;
   (2) comparing the intensity of the recorded fluorescent emission of the $H_2S$-responsive fluorescent probe compound in the mixed, incubated, and excited combination of (E) with a standard curve of fluorescent emission intensities of the same $H_2S$-responsive fluorescent probe compound in control mixtures containing known concentrations of $H_2S$; and
   (3) determining the concentration of $H_2S$ in the sample by matching the intensity of fluorescent emission of the $H_2S$-responsive fluorescent probe compound in the sample to that of a control mixture on the standard curve.

3. The method of claim 1, wherein the sample is a crude oil sample.

4. The method of claim 1, wherein the sample is an industrial wastewater sample.

5. The method of claim 3, wherein the $H_2S$-responsive fluorescent probe compound is a lanthanide-based $H_2S$-responsive fluorescent probe compound selected from at least one of Probe 1 or Probe 3.

6. The method of claim 4, wherein the $H_2S$-responsive fluorescent probe compound is Probe 3.

7. The method of claim 5, wherein the probe compound being used displays increased fluorescence in the presence of $H_2S$ upon excitation with the suitable wavelength of light.

8. The method of claim 7, wherein the probe compound being used displays increased fluorescence in the presence of $H_2S$ upon excitation with the suitable wavelength of light.

9. The method of claim 1, wherein the suitable solvent is selected from DMSO, dioxane, or combinations thereof.

* * * * *